United States Patent [19]
Ito

[11] Patent Number: 5,970,435
[45] Date of Patent: Oct. 19, 1999

[54] AUTOMATIC LOAD MEASURING DEVICE

[75] Inventor: Daisuke Ito, Shizuoka, Japan

[73] Assignee: Yazaki Corporation, Tokyo, Japan

[21] Appl. No.: 08/823,313

[22] Filed: Mar. 21, 1997

[30] Foreign Application Priority Data

Mar. 22, 1996 [JP] Japan ................................. 8-066381

[51] Int. Cl.⁶ .................................................. G06F 19/00
[52] U.S. Cl. ............................. 702/173; 701/59; 706/20
[58] Field of Search ................................. 702/173, 174; 701/99, 102, 111, 59; 706/20, 35, 23, 25, 41

[56] References Cited

U.S. PATENT DOCUMENTS

| | | | |
|---|---|---|---|
| 4,542,730 | 9/1985 | Nagasawa et al. | 123/674 |
| 4,979,124 | 12/1990 | Sachse et al. | 702/39 |
| 5,093,792 | 3/1992 | Taki et al. | 701/99 |
| 5,099,428 | 3/1992 | Takahashi | 701/59 |
| 5,175,796 | 12/1992 | Refregier et al. | 706/20 |
| 5,285,523 | 2/1994 | Takahashi | 395/22 |
| 5,361,213 | 11/1994 | Fujieda et al. | 706/95 |
| 5,479,572 | 12/1995 | Marcantonio | 706/20 |

FOREIGN PATENT DOCUMENTS

| | | | |
|---|---|---|---|
| 0 545 641 | 6/1993 | European Pat. Off. | G01M 17/02 |
| WO 95/24616 | 1/1995 | WIPO | G01G 19/12 |

OTHER PUBLICATIONS

Database Inspec of Electrical Engineers, stevenage, GL Inspec No. AN 5789021, 1996 Dokev N B: "An Approach for Closed Transport Systems Control Using Neural Networks" XP002065963 *Abstract & Probl. Tekh. Kibern. Robot: Bulgarian Acad. Sci–Inst. of Inf. Technol.—Sofia Bulgaria vol. 44, 1996, pp. 36–39.

*Primary Examiner*—Marc S. Hoff
*Assistant Examiner*—Bryan Bui
*Attorney, Agent, or Firm*—Sughrue, Mion, Zinn, Macpeak & Seas, PLLC

[57] ABSTRACT

An automatic load measuring device includes an actual load calculating device. The actual load calculating device includes a multi-layer feed-forward type neural network having an input layer, an intermediate layer and an output layer arranged in a hierarchial manner. Also, the actual load calculating device, by use of the multi-layer feed-forward type neural network, can previously execute learning relating to the correction of a carrying load of a vehicle to be measured by automatic load measuring sensors respectively used to measure the carrying loads of the vehicle using measured load information measured by the automatic load measuring sensors, and, based on the result of the learning, can correct the carrying loads measured by the automatic load measuring sensors so as to find the actual load of the vehicle.

10 Claims, 8 Drawing Sheets

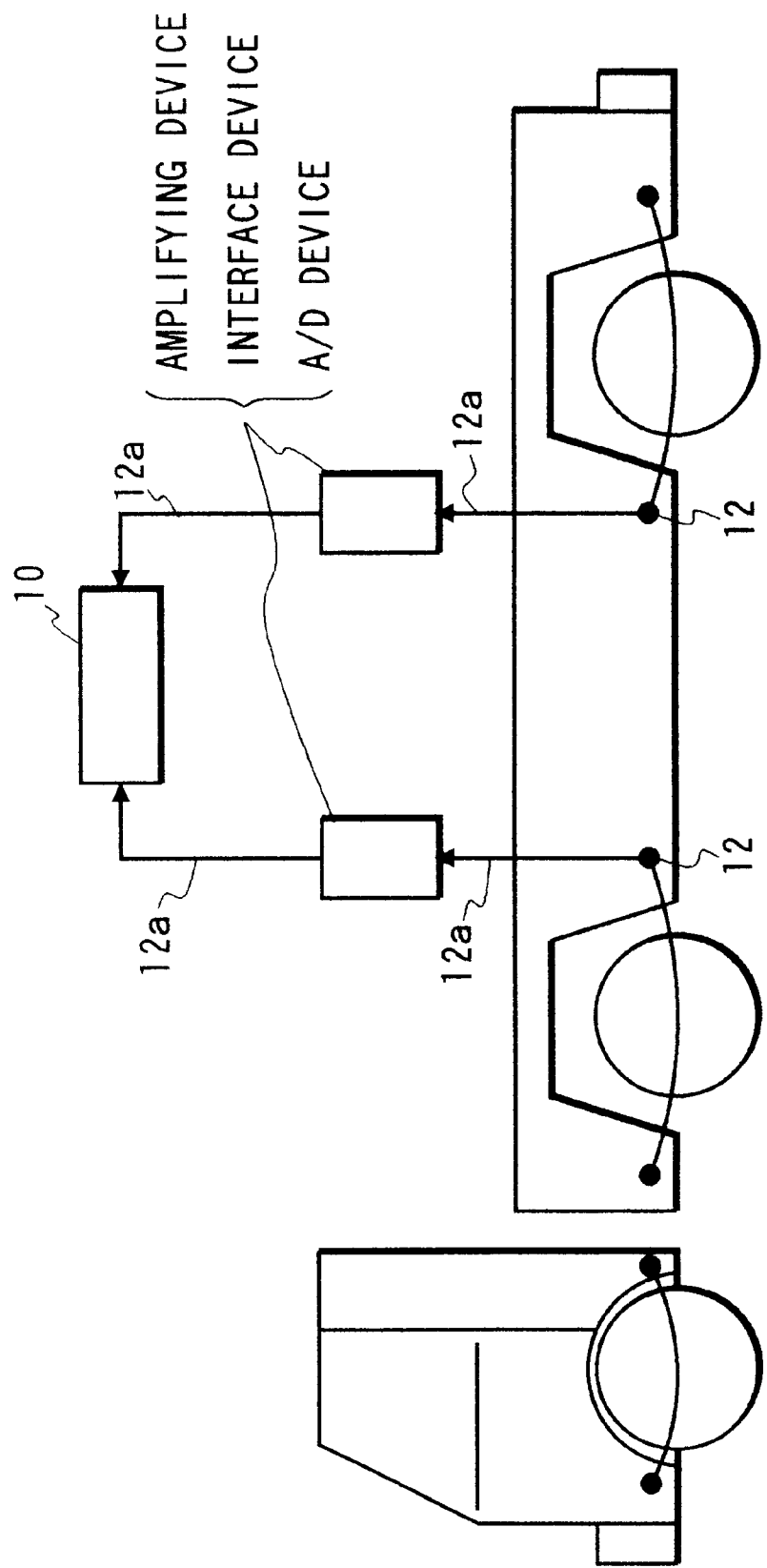

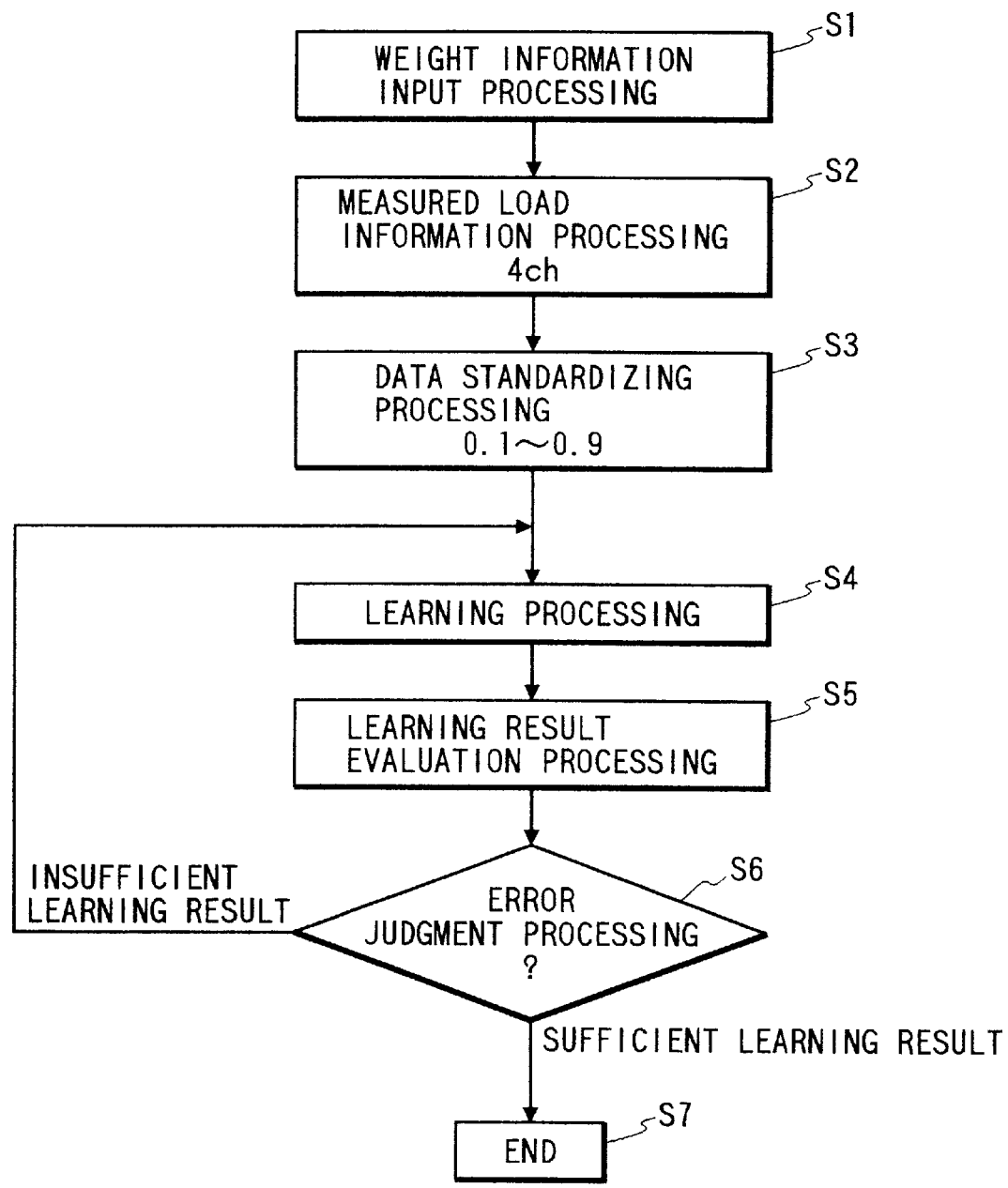

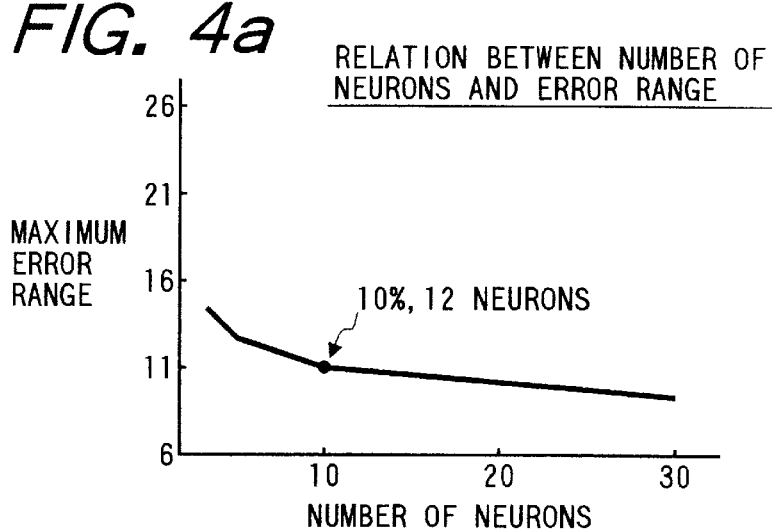
FIG. 4a  RELATION BETWEEN NUMBER OF NEURONS AND ERROR RANGE
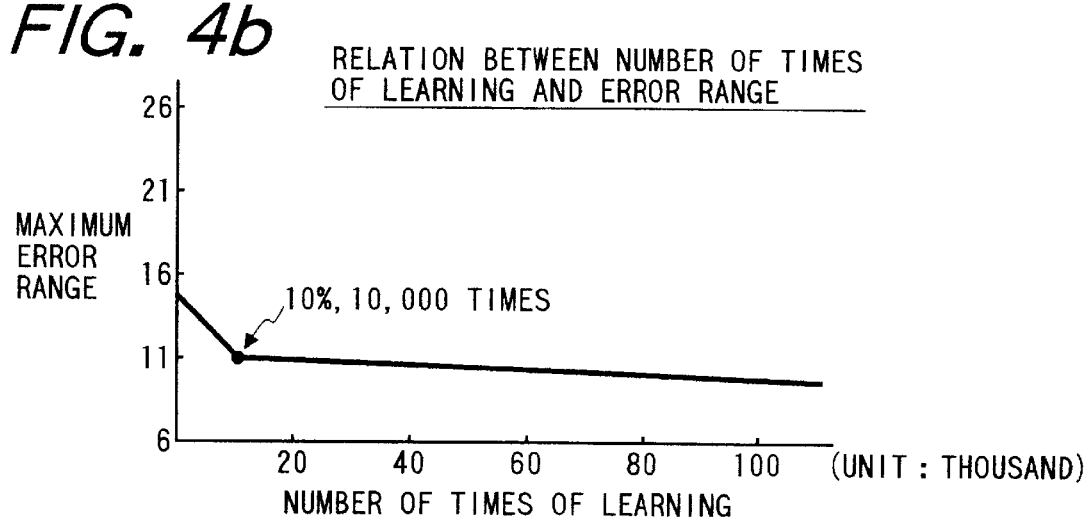
FIG. 4b  RELATION BETWEEN NUMBER OF TIMES OF LEARNING AND ERROR RANGE
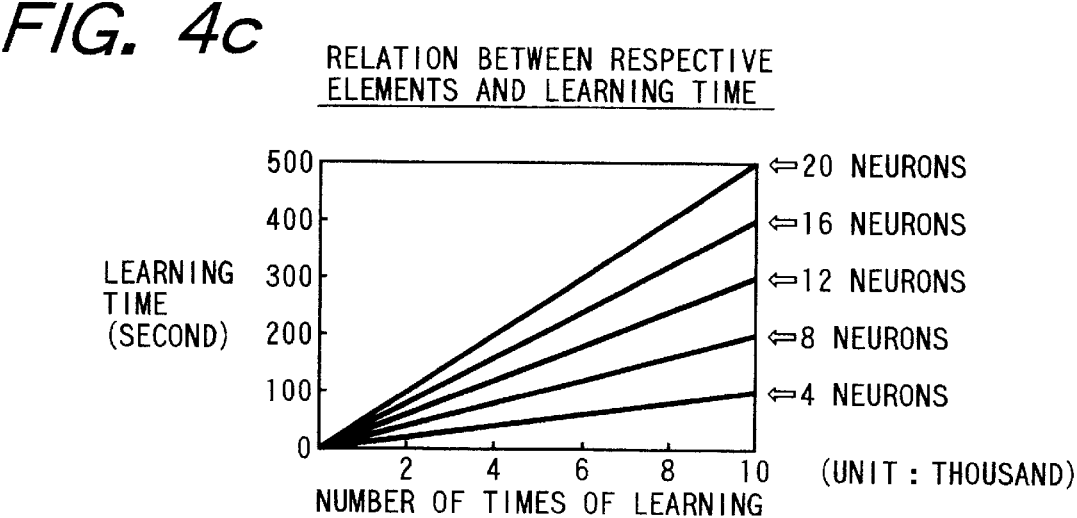
FIG. 4c  RELATION BETWEEN RESPECTIVE ELEMENTS AND LEARNING TIME

FIG. 5

| | INPUT LAYER 16A | INTERMEDIATE LAYER 16B | OUTPUT LAYER 16C |
|---|---|---|---|
| NUMBER OF NEURONS | | 12 | SAME NUMBER OF DATA AS TARGETS |
| TRANSMISSION FUNCTION | | TANGENT SIGMOID | PURE LINE |
| NUMBER OF TIMES OF LEARNING 0 | TEN THOUSAND TIMES | | |

UNIFORM LOAD

SOLID LINE : ACTUAL LOAD INFORMATION 16a
BROKEN LINE : MEASURED LOAD INFORMATION 12a

FIG. 7a

| LOAD PATTERN | MAXIMUM ERROR RANGE BEFORE LEARNING (MEASURED LOAD INFORMATION 12a) |
|---|---|
| UNIFORM LOAD | 15% |
| FORWARDLY BIASED LOAD | 13% |
| BACKWARDLY BIASED LOAD | 15% |
| RIGHT BIASED LOAD | 15% |
| LEFT BIASED LOAD | 9% |

FIG. 7b

| LOAD PATTERN | MAXIMUM ERROR RANGE AFTER LEARNING (ACTUAL LOAD INFORMATION 16a) |
|---|---|
| UNIFORM LOAD | 3% |
| FORWARDLY BIASED LOAD | 3% |
| BACKWARDLY BIASED LOAD | 5% |
| RIGHT BIASED LOAD | 4% |
| LEFT BIASED LOAD | 3% |

RELATION BETWEEN CARRYING LOAD AND DISPLAY VALUE

AUTOMATIC LOAD MEASURING DEVICE

BACKGROUND OF THE INVENTION

1. Field of the Invention

This invention relates to an automatic load measuring device which is able to correct a carrying load measured by one or more automatic load measuring sensors to thereby find the actual load of a vehicle.

2. Background

FIG. 8a is a graphical representation which shows a relationship between a display value, a carrying load, a carrying load pattern respectively obtained when a conventional automatic load measuring device is used. Also, FIGS. 8b and 8c are respectively graphical representations to explain the correction results that are obtained when an inflection point correction is made. Further, FIGS. 8d and 8e are respectively graphical representations to show the correction results that are obtained when the same inflection point correction corrections is used in another carrying load pattern.

The output characteristic of an automatic load measuring sensor used in the automatic load measuring device, as shown in FIG. 8a, generally has an upwardly projecting shape. Also, the automatic load measuring sensor shows output characteristics which are different from each other according to the patterns of the carrying loads of a vehicle such as the uniform carrying load, forwardly biased carrying load, backwardly biased carrying load, right biased carrying load, left biased carrying load, and other similarly biased carrying loads of the vehicle.

Conventionally, in order to correct the influences of the output characteristics of the automatic load measuring sensors and the influences of the carrying load patterns of the vehicle, as shown in FIG. 8b or 8c, there has been used an inflection point correction method.

The term "inflection point correction" means correction in which there is set an arbitrary load value and load values larger or smaller than the thus set load value are multiplied by different coefficients to thereby allow the projecting-shaped output characteristic of the load measuring sensor to approach to a straight line.

However, the inflection point correction method used in the conventional automatic load measuring device is truly able to cope with the carrying load patterns of the vehicle only when a specific type of automatic load measuring sensor is used but, as shown in FIGS. 8d and 8e, when the carrying load of the vehicle is measured by use of the other types of automatic load measuring sensors or when other types of carrying load patterns are measured, the inflection point correction method finds it difficult to correct the load carrying patterns of the vehicle and the output characteristics of the automatic load measuring sensors with high accuracy.

SUMMARY OF THE INVENTION

The present invention aims at eliminating the drawbacks found in the above-mentioned conventional automatic load measuring device. Accordingly, it is an object of the invention to provide an automatic load measuring device including an actual load calculating device: in particular, the actual load calculating device includes a multi-layer feed-forward type neural network having an input layer, an intermediate layer and an output layer arranged in a hierarchical manner, and the actual load calculating device, using this multi-layer feed-forward type neural network, previously executes learning relating to the correction of the carrying loads of a vehicle measured by one or more automatic load measuring sensors respectively used to measure the carrying loads of the vehicle in accordance with the measured load information that is measured by the automatic load measuring sensors, and corrects the carrying loads measured by the automatic load measuring sensors based on the result of the above-mentioned learning to find an actual load. That is, due to provision of such actual load calculating device, the present automatic load measuring device is able to correct the carrying load patterns of the vehicle and the output characteristics of the automatic load measuring sensors with high accuracy.

In attaining the above object, according to a first aspect of the invention, there is provided an automatic load measuring device which includes an actual load calculating device. The actual load calculating device includes a multi-layer feed-forward type neural network having an input layer, an intermediate layer and an output layer arranged in a hierarchical arrangement, and also the actual load calculating device is arranged such that, by use of the above-mentioned multi-layer feed-forward type neural network, it can previously execute learning relating to the correction of the carrying load of a vehicle to be measured by one or more automatic load measuring sensors respectively used to measure the carrying load of the vehicle using one or more given learning parameters and also can correct the carrying loads of the vehicle measured by the automatic load measuring sensors based on the result of such learning to thereby find the actual load of the vehicle.

By using the above-mentioned actual load calculating device, the influences of the patterns of the carrying loads of the vehicle such as an uniform carrying load, a forwardly biased carrying load, a backwardly biased carrying load, a right biased carrying load, a left biased carrying load, and the other similarly biased carrying loads of the vehicle, and also the influences of the output characteristics of the automatic load measuring sensors, can be corrected with high accuracy.

According to a second aspect of the invention, one or more given learning parameters which are used for the learning to be executed by the present actual load calculating device are one or more pieces of measured load information which are respectively measured about the carrying loads of the vehicle by use of the above-mentioned automatic load measuring sensors.

By using such actual load calculating device, the influences of the output characteristics of the automatic load measuring sensors can be corrected with high accuracy.

In a multi-layer feed-forward type neural network provided in the automatic load measuring device according to a third aspect of the invention, neurons forming the input layer are set in number according to the number of the above-mentioned given learning parameters one to one, while the neurons of the input layer are respectively combined with their associated one of all the neurons forming the intermediate layer in accordance with the weight information that has been previously learned about all the neurons forming the intermediate layer.

Further, neurons forming the output layer are respectively combined with their associated one of all the neurons forming the intermediate layer in accordance with the weight information that has been previously learned about all the neurons forming the intermediate layer.

That is, due to use of such multi-layer feed-forward type neural network, the actual load calculating device is able to output actual load information based on a neuro-operation using the above-mentioned learning parameters.

Due to use of the actual load calculating device including such multi-layer feed-forward type neural network, the measured load information, which has been influenced, by the patterns of the carrying loads of a vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load information, that is, the true carrying load of the vehicle can be calculated.

According to a fourth aspect of the invention, the present automatic load measuring device further includes a memory device which is able to store therein and read out therefrom at any time the previously learned weight information between the input layer and the intermediate layer, and the previously learned weight information between the intermediate layer and the output layer.

In the multi-layer feed-forward type neural network provided in the automatic load measuring device according to the fourth aspect of the invention, neurons forming the input layer are set in number according to the number of the above-mentioned given learning parameters one to one, while the neurons of the input layer are respectively combined with their associated ones of all the neurons forming the intermediate layer in accordance with the previously learned weight information between the input layer and the intermediate layer that is read out from said memory device with respect to all the neurons forming the intermediate layer.

Further, neurons forming the output layer are respectively combined with their associated ones of all the neurons forming the intermediate layer in accordance with the previously learned weight information between the intermediate layer and the output layer that is read from the memory device with respect to all the neurons forming the intermediate layer.

That is, due to use of such multi-layer feed-forward type neural network, the actual load calculating device according to the fourth aspect of the invention is able to output actual load information based on a neuro-operation using the above-mentioned learning parameters.

Due to use of the actual load calculating device including such multi-layer feed-forward type neural network, the measured load information, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load information, that is, the true carrying load of the vehicle can be calculated. Also, since the weight information can be stored into and read out from the memory device at any time, it is easy to edit and debug the weight information at a place away from the vehicle. Further, even when there occurs any inconvenience in the automatic measuring device, the weight information can be left retreated in the memory device. That is, after such inconvenience is eliminated, if the automatic load measuring device is reset and the weight information is read again into the automatic load measuring device, then the automatic load measuring device can be started again quickly and easily.

The multi-layer feed-forward type neural network provided in the actual load calculating device according to a fifth aspect of the invention includes, between the input layer and the intermediate layer, sensor kind identification neurons which are respectively used to input sensor kind identification information for identifying the kind of the automatic load measuring sensors.

The sensor kind identification neurons according to the fifth aspect of the invention are respectively combined with their associated ones of all the neurons forming the input layer in accordance with the weight information that has been previously learned between the present sensor kind identification neurons and the input layer about all the neurons forming the input layer, and are further combined respectively with their associated one of all the neurons forming the intermediate layer in accordance with the weight information that has been previously learned between the present sensor kind identification neurons and the intermediate layer about all the neurons forming the intermediate layer.

Due to use of the actual load calculating device including the multi-layer feed-forward type neural network with such sensor kind identification neurons, the measured load information, which has been influenced, by the patterns of the carrying loads of a vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load information, that is, the true carrying load of the vehicle can be calculated. Also, since the weight information can be stored into and read out from the memory device at any time, it is easy to edit and debug the weight information at a place away from the vehicle. Further, even when there occurs any inconvenience in the automatic measuring device, the weight information can be left retreated in the memory device. That is, after such inconvenience is eliminated, if the automatic load measuring device is reset and the weight information is read again into the automatic load measuring device, then the automatic load measuring device can be started again quickly and easily.

The automatic load measuring device according to a sixth aspect of the invention, further includes a memory device which is able to store therein and read out therefrom at any time the previously learned weight information between the input layer and intermediate layer, the previously learned weight information between the intermediate layer and the output layer, the weight information previously learned between the sensor kind identification neurons and input layer about all the neurons forming the input layer according to the sensor kind identification information, and the weight information previously learned between the sensor kind identification neurons and the intermediate layer about all the neurons forming the intermediate layer according to the sensor kind identification information.

In the multi-layer feed-forward type neural network according to the sixth aspect of the invention, the sensor kind identification neurons are respectively combined with the neurons of the input layer in accordance with the weight information between the sensor kind identification neurons and the input layer that is read out from the memory device.

Further, the sensor kind identification neurons are respectively combined with the neurons of the intermediate layer in accordance with the weight information between the sensor kind identification neurons and intermediate layer that is read out from the memory device.

Still further, the neurons forming the input layer are respectively combined with their associated ones of all the neurons forming the intermediate layer in accordance with the previously learned weight information between the input layer and the intermediate layer that is read out from the memory device.

Yet further, the neurons forming the intermediate layer are respectively combined with their associated one of all the neurons forming the output layer in accordance with the previously learned weight information between the intermediate layer and the output layer that is read out from the memory device.

By using the actual load calculating device including a multi-layer feed-forward type neural network with the above-mentioned sensor kind identification neurons added thereto, the measured load information, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristic of the automatic load measuring sensors, can be corrected with high accuracy in order that the true carrying load of the vehicle, that is, the actual load information can be calculated. Also, since the weight information can be stored into and read out from the memory device at any time, the weight information can be edited or debugged easily at a place which is away from the vehicle. Further, even if there occurs any inconvenience in the present automatic load measuring device, the weight information can be left retreated in the memory device. That is, after such inconvenience is eliminated, if the automatic load measuring device is reset and the weight information is read therein again, then the automatic load measuring device can be started again quickly and easily.

The automatic load measuring device according to the seventh aspect of the invention, the actual load calculating device is arranged such that it is able to correct a teacher signal to execute a re-learning operation.

Due to use of the above-mentioned re-learnable actual load calculating device, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and the influences of the output characteristics of the automatic load measuring sensors, can be reflected on the weight information with higher accuracy. This makes it possible to correct the measured load information with higher accuracy so that the actual load information, that is, the true carrying load of the vehicle can be calculated.

Also, due to use of such re-learnable actual load calculating device, the change of the carrying load patterns of the vehicle as well as the change of the output characteristics of the automatic load measuring sensors can be reflected on the weight information flexibly and quickly, which makes it possible to correct the measured load information with higher accuracy, and to calculate the actual load information that is the true carrying load of the vehicle.

The automatic load measuring device according to a eighth aspect of the invention, in the multi-layer feed-forward type neural network, a transmission function between the input layer and intermediate layer is a tangent sigmoid function, while a transmission function between the intermediate layer and the output layer is a pure line function.

With use of the above-mentioned actual load calculating device, the maximum error range between the measured load information and the actual load calculating device can be minimized. That is, the measured load information can be corrected with high learning accuracy and thus the actual load information, that is, the true carrying load of the vehicle can be calculated.

The automatic load measuring device according to a ninth aspect of the invention, further includes a load display device which is used to display the actual load information.

Due to use of such load display device, the actual load calculating device, that is, the true carrying load of the vehicle calculated can be recognized real time on the spot.

BRIEF DESCRIPTION OF THE DRAWINGS

FIG. 2 is a structure view to show how to mount the automatic load measuring device according to the embodiment of the invention onto a vehicle;

FIG. 3 is a flow chart of a learning course employed in the automatic load measuring device according to the embodiment of the invention;

FIGS. 4a to 4c each shows an explanatory view of the learning course of the automatic load measuring device according to the embodiment of the invention; in particular, FIG. 4a is a graphical representation of a relation between the number of neurons and the maximum error range, FIG. 4b is a graphical representation of a relation between the number of times of learning and the maximum error range, and FIG. 4c is a graphical representation of a relation between the number of times of learning and the time necessary for learning;

FIG. 5 is a table which shows the concrete examples of the number of neurons, the transmission functions, and the number of times of learning respectively used in an actual load calculating device (multi-layer feed-forward type neural network) according to the embodiment of the invention;

FIGS. 7a and 7b are tables which respectively show the maximum error ranges of the display values and the carrying load patterns obtained as the results of use of the actual load calculating device (multi-layer feed-forward type neural network) according to an embodiment of the invention; FIG. 8a is the graphical representation which shows the relation between the display value, the carrying load, and the carrying load pattern respectively obtained when the conventional automatic load measuring device is used, FIGS. 8b and 8c are respectively the graphical representations to explain the correction results obtained when the inflection point correction method is used, and, FIGS. 8d and 8e are respectively the graphical representations to show the correction results obtained when the same inflection point correction method is applied in another carrying load pattern.

DETAILED DESCRIPTION OF THE PREFERRED EMBODIMENT

Now, description will be given below of a preferred embodiment of an automatic load measuring device according to the invention with reference to the accompanying drawings.

At first, description will be given below of the main portion of the structure of an automatic load measuring device 10 according to the present embodiment of the invention with reference to FIGS. 1 and 2.

Figure 1:
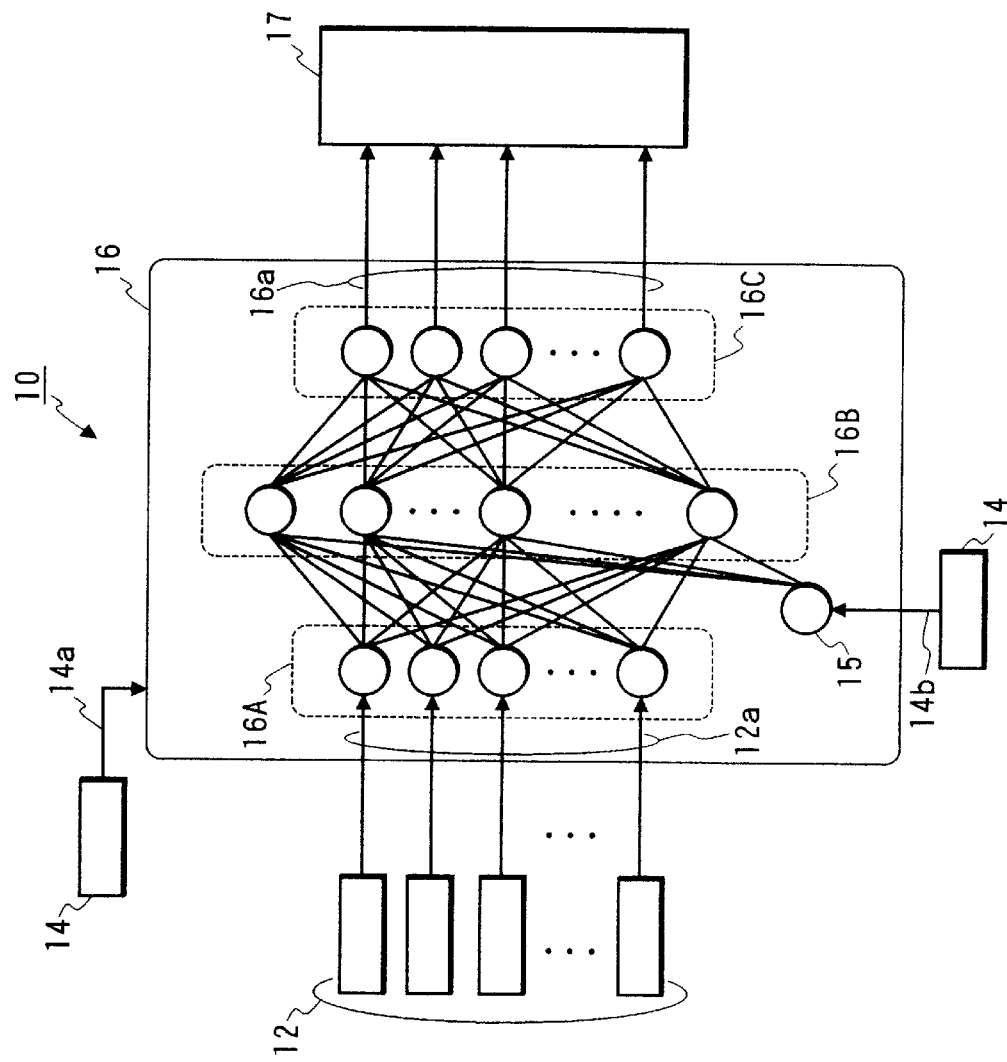
FIG. 1 is a functional block diagram of an automatic load measuring device according to an embodiment of the invention.

FIG. 1 is a functional block diagram of an automatic load measuring device 10 according to the present embodiment of the invention. Also, FIG. 2 is a structure view of the automatic load measuring device 10 according to the present embodiment of the invention, showing how to mount it into a vehicle.

The present automatic load measuring device 10, as shown in FIG. 1, includes an actual load calculating device 16 which includes a multi-layer feed-forward type neural network having an input layer 16A, an intermediate layer 16B and an output layer 16C arranged in a hierarchical manner, and using this multi-layer feed-forward type neural network, can learn previously by use of given learning parameters about the correction of the carrying load of a vehicle measured by one or more automatic load measuring sensors 12 respectively used to measure the carrying load of the vehicle in accordance with the measured load information that is measured by the automatic load measuring sensors 12, and also can correct the carrying load measured by the automatic load measuring sensors 12 to find an actual load. In the present embodiment, in particular, the above-mentioned learning is realized by a previous teach learning using back propagation learning rules.

According to the present embodiment, as shown in FIG. 2, there are used a plurality of automatic load measuring sensors 12 which are respectively set at their respective given positions under the bed of the vehicle. In particular, according to the present embodiment, the automatic load measuring sensors 12 are respectively set in the neighborhood of the respective wheel axles one for one.

The sensor outputs of the automatic load measuring sensors 12 are transmitted through an amplifying device, an interface device, and an A/D device respectively shown in FIG. 2 and a given digital processing is performed on the sensor outputs, with the result that the sensor outputs are obtained as measured load information 12a.

By using the above-mentioned actual load calculating device 16, the influences of the patterns of the carrying loads of a vehicle such as the uniform carrying load, a forwardly biased carrying load, a backwardly biased carrying load, a right biased carrying load, a left biased carrying load, and the other similarly biased carrying loads of the vehicle, and/or the influences of the output characteristics of the automatic load measuring sensors 12 can be corrected with high accuracy.

The automatic load measuring device 10, as shown in FIG. 1, further includes a memory device 14 which is able to store therein and read out therefrom at any time a weight information 14a previously learned between the input layer 16A and the intermediate layer 16B, the weight information 14a previously learned between the intermediate layer 16B and the output layer 16C, weight information 14a previously learned between the input layer A and sensor kind identification neurons 15 about all neurons forming the input layer 16A in accordance with sensor kind identification information 14b (in particular, previously teach learned about the same neurons using the back propagation learning rules), and the weight information 14a previously learned between the intermediate layer 16B and the sensor kind identification neuron 15 about all neurons forming the input layer 16B in accordance with the sensor kind identification information 14b.

As the memory device 14, there can be used a semiconductor memory device such as an EEPROM or the like, a magneto-optical memory device such as an MO or the like, or a magnetic memory device such as a magnetic disk or the like.

Use of the above-mentioned actual load calculating device 16 can correct the influences of the output characteristics of the automatic load measuring sensors 12 with high accuracy.

Also, the automatic load measuring device 10, as shown in FIG. 1, further includes a load display device 17 which is used to display actual load information 16a.

With use of the present load display device 17, the actual load calculating device 16, that is, the true carrying load of the vehicle calculated can be recognized real time at the spot.

Next, description will be given below of the structure of the actual load calculating device 16 according to the present embodiment of the invention with reference to FIGS. 1 and 2.

The present actual load calculating device 16, as shown in FIG. 1, by use of a multi-layer neural network of a feed-forward type, is able to output an actual load information 16a based on a neuro-operation using given learning parameters.

The learning about the correction of the vehicle carrying load to be measured by the automatic load measuring sensors 12 is realized by teach learning using back propagation. The weight information 14a can be generated in compliance with the learning rules of this back propagation. Also, the given learning parameters to be used for the learning to be executed in the actual load calculating device 16 is measured load information 12a on the carrying load that is measured by use of the automatic load measuring sensors 12.

The actual load calculating device 16 is further arranged such that it is able to correct a teacher signal to thereby carry out a re-learning operation in accordance with an manual adjustment.

Due to use of such re-learnable actual load calculating device 16, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and the influences of the output characteristics of the automatic load measuring sensors 12, can be reflected on the weight information with higher accuracy. This makes it possible to correct the measured load information 12a with higher accuracy, and to calculate the actual load information 16a, that is, the true carrying load of the vehicle. In particular, the re-learning can be realized by previous teach learning using the back propagation learning rules.

Also, thanks to use of such re-learnable actual load calculating device 16, the change of the vehicle carrying load patterns as well as the change of the output characteristics of the automatic load measuring sensors 12 can be reflected on the weight information 14a flexibly and quickly, which makes it possible to correct the measured load information 12a with higher accuracy in calculating the actual load information 16a that is the true carrying load of the vehicle.

Next, description will be given below of the structure of a multi-layer neural network of a feed-forward type according to the present embodiment of the invention with reference to the accompanying drawings.

FIGS. 4a to 4c are graphical representations which respectively explain the learning course of the automatic load measuring device 10 according to the present embodiment of the invention. In particular, FIG. 4a is a graphical representation to show a relation between the number of neurons and the maximum error range, FIG. 4b is a graphical representation to show a relation between the number of times of learning and the maximum error range, and FIG. 4c a graphical representation to show a relation between the number of times of learning and the time necessary for the learning.

Also, FIG. 5 is a table which shows the concrete examples of the number of neurons, transmission functions, and number of times of learning used in the actual load calculating device 16 (multi-layer feed-forward type neural network) according to the present embodiment of the invention.

Figure 6:
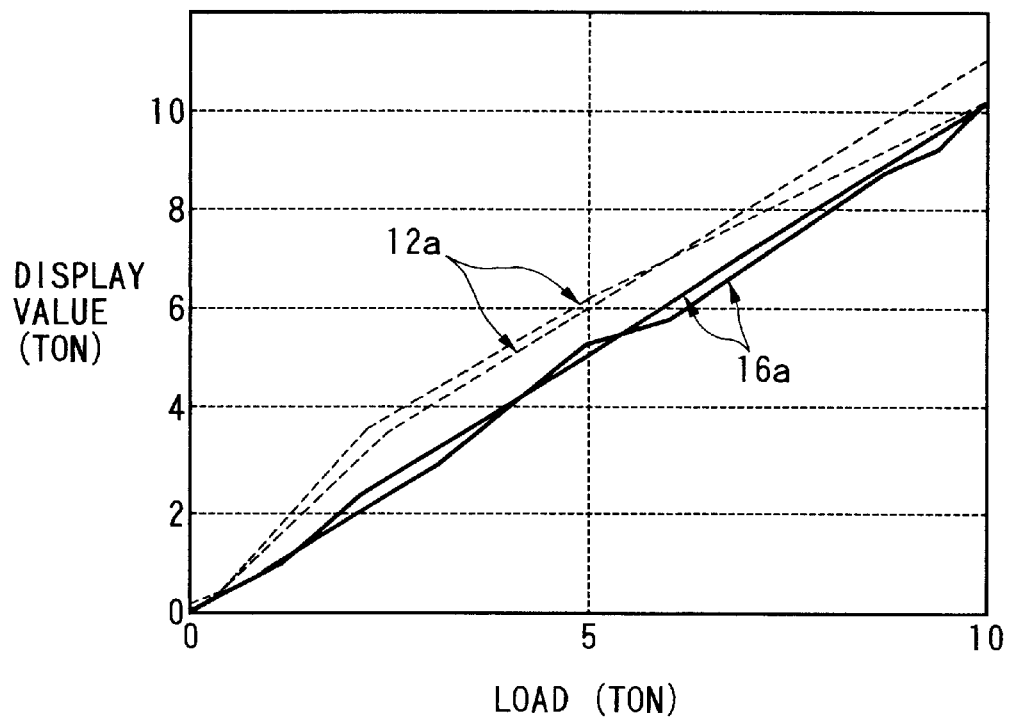
FIG. 6 is a graphical representation which shows a relation between display values and carrying loads obtained as the results of use of the actual load calculating device (multi-layer feed-forward type neural network) according to the embodiment of the invention.
Figure 8A:
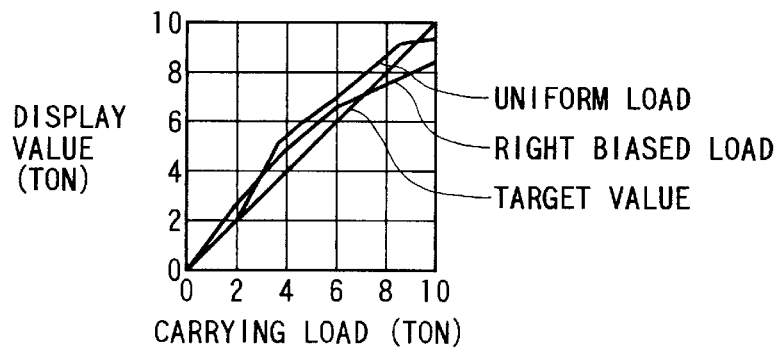
FIGS. 8a to 8e are the graphical representations of the conventional automatic load measuring device; in particular.
Figure 8B:
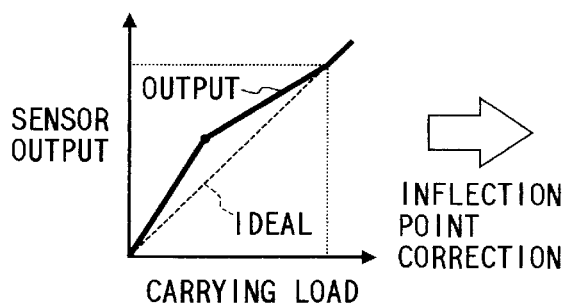
Figure 8C:
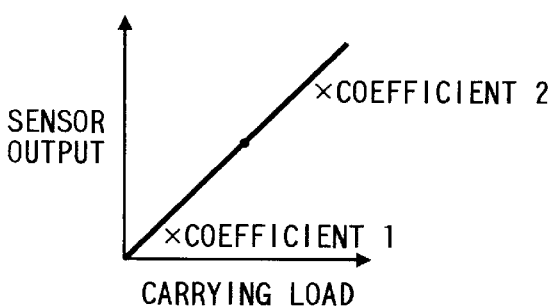
Figure 8D:
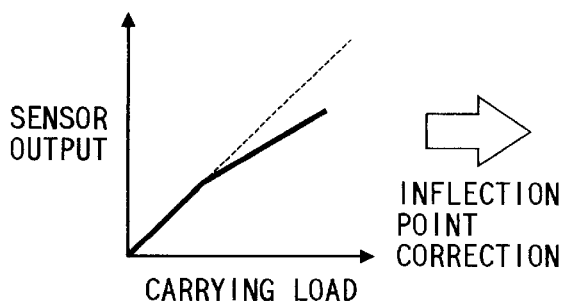
Figure 8E:
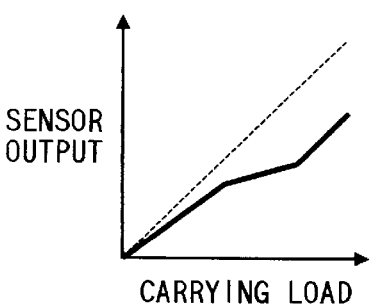

Further, FIG. 6 is a graphical representation which shows a relation between display values and carrying loads obtained as the results of use of the actual load calculating device 16 (multi-layer feed-forward type neural network) according to the present embodiment of the invention.

Still further, FIGS. 7a and 7b are tables which respectively show the maximum error range of the display values and the carrying load patterns obtained as the results of use of the actual load calculating device 16 (multi-layer feed-forward type neural network) according to the present embodiment of the invention.

As shown in FIG. 5, in the multi-layer feed-forward type neural network, a transmission function between the input layer 16A and the intermediate layer 16B is a tangent sigmoid function, whereas a transmission function between the intermediate layer 16B and the output layer 16C is a pure line function.

As shown in FIG. 4b and FIG. 5, in order that the maximum error range between the measured load information 12a and the actual load calculating device 16 can be controlled into the range of 10% or less, the number of times of learning (in particular, the number of times of previous teach learning executed using the back propagation learning rules) is set on the order of 10,000.

In the multi-layer neural network of a feed-forward type employed in the automatic load measuring device 10, the neurons forming the input layer 16A, as shown in FIG. 1, are set in number according to the number of the given learning parameters one to one, and are respectively combined with their associated ones of all the neurons forming the intermediate layers 16B in accordance with the weight information (in particular, weight information previously teach learned using the back propagation learning rules) learned previously about all the neurons forming the intermediate layer 16B (in particular, previously teach learned using the back propagation learning rules).

The number of neurons forming the input layer 16A is decided in accordance with the number of the carrying load patterns of the vehicle. In particular, when there are used five kinds of carrying load patterns including the uniform carrying load, the forwardly biased carrying load, the backwardly biased carrying load, the right biased carrying load and the left biased carrying load, the number of neurons forming the input layer 16A is set as 5.

Also, the number of neurons forming the intermediate layer 16B, as shown in FIG. 4a and FIG. 5, is set as 12 so that the maximum error range between the measured load information 12a and the actual load calculating device 16 can be controlled in the range of 10% or less. However, since the number of neurons forming the intermediate layer 16B is to be decided in accordance with the degree of difficulty of learning, in the present embodiment, it is considered that the number of neurons is variable.

Further, the respective neurons forming the output layer 16C, as shown in FIG. 1, are combined with their associated ones of all the neurons forming the intermediate layer 16B in accordance with the weight information 14a previously learned about all the neurons forming the intermediate layer 16B.

In addition, a concrete multi-layer neural network of a feed-forward type can be achieved by a program on a computer.

In the present embodiment of the invention, when it is assumed that the number of neurons forming the intermediate layer 16B is 12 and the number of times of learning is 10,000, as shown in FIG. 4c, the time of learning necessary until the maximum error range between the measured load information 12a and the actual load calculating device 16 can be controlled in the range of 10% or less is on the order of 300 hours.

Due to use of such actual load calculating device 16, as shown in FIGS. 4a to 4c, the maximum error range between the measured load information 12a and the actual load calculating device 16 can be minimized by the shortest learning time and the smallest number of times of learning. That is, the measured load information 12a can be corrected with high accuracy and thus the actual load information 16a, that is, the true carrying load of the vehicle can be calculated.

By using such actual load calculating device 16 including the above-mentioned multi-layer neural network of a feed-forward type, the measured load information 12a, which has been influenced by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors 12, can be corrected with high accuracy in order that the actual load information 16a, that is, the true carrying load of the vehicle can be calculated.

The actual load calculating device 16, by using such multi-layer neural network of a feed-forward type, is able to output the actual load information 16a based on a neuro-operation using the given learning parameters.

With use of the actual load calculating device 16 including a multi-layer neural network of a feed-forward type decided by the weight information 14a read out from the memory device 14, as shown by the graphical representation of the relation between the display values and the carrying loads in FIG. 6, the measured load information 12a influenced by the output characteristics of the automatic load measuring sensors 12 can be corrected with high accuracy (in particular, a correction can be made in which the maximum error of the order of 15% is reduced down to 3% or so), so that the actual load information 16, that is, the true carrying load of the vehicle can be calculated.

Also, as shown by the tables in FIG. 7 which shows the relation between the maximum error range and the carrying load patterns, the measured load information 12a which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors 12, can be corrected with high accuracy (in particular, in the respective types of carrying load patterns, a correction can be made in which the maximum error in the range of 9% to 15% can be reduced down to the range of 3% to 5%) in order that the actual load information 16a, that is, the true carrying load of the vehicle can be calculated.

Next, description will be given below of the structure of a multi-layer feed-forward type neural network including sensor kind identification neurons 15 with reference to FIG. 1.

The present multi-layer feed-forward type neural network includes, between the input layer 16A and the intermediate layer 16B, the sensor kind identification neurons 15 which are respectively used to input sensor kind identification information 14b for identifying the kind of the automatic load measuring sensors 12.

The present sensor kind identification neurons 15, as shown in FIG. 1, are respectively combined with all the neurons forming the input layer 16A in accordance with the weight information 14a previously learned (in particular, previously teach learned using the back propagation learning rules) between the input layer 16A and the present sensor kind identification neuron 15 about all the neurons forming the input layer 16A according to the sensor kind identification information 14b (in particular, the weight information 14a previously teach learned using the back propagation learning rules). Also, the present sensor kind identification neurons 15 are respectively combined with all the neurons forming the intermediate layer 16B in accordance with the weight information 14a previously learned between the intermediate layer 16B and the present sensor kind identification neuron 15 about all the neurons forming the input layer 16B according to the sensor kind identification information 14b.

In the multi-layer neural network of a feed-forward type, the sensor kind identification neurons 15 are respectively combined with the respective neurons of the input layer 16A in accordance with the previously learned weight information 14a between the sensor kind identification neuron 15 and the input layer 16A that is read out from the memory device 14.

Also, the sensor kind identification neurons 15 are respectively combined with the respective neurons of the intermediate layer 16B in accordance with the previously learned weight information 14a between the sensor kind identification neuron 15 and the intermediate layer 16B that is read out from the memory device 14.

Further, the neurons forming the input layer 16A are respectively combined with the respective ones of all the neurons forming the intermediate layer 16B in accordance with the previously learned weight information 14a between the input layer 16A and the intermediate layer 16B that is read out from the memory device 14.

Still further, the neurons forming the intermediate layer 16B are respectively combined with the respective ones of all the neurons forming the output layer 16C in accordance with the previously learned weight information 14a between the intermediate layer 16B and the output layer 16C that is read out from the memory device 14.

By using the actual load calculating device 16 including the multi-layer feed-forward type neural network with such sensor kind identification neurons 15 added thereto, the measured load information 12a, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors 12, can be corrected with high accuracy in order that the actual load information 16a, that is, the true carrying load of the vehicle can be calculated. Also, since the weight information 14a can be stored into and read out from the memory device 14 at any time, the weight information 14a can be edited or debugged easily at a place which is away from the vehicle. Further, even if there occurs any inconvenience in the automatic load measuring device 10, the weight information 14a can be left retreated in the memory device 14. Therefore, after such inconvenience is eliminated, if the automatic load measuring device 10 is reset and the weight information 14a is read again into the automatic load measuring device 10, then the automatic load measuring device 10 can be started again quickly and easily.

The actual load calculating device 16 is arranged such that it is able to correct a teacher signal to carry out re-learning, in accordance with a manual adjustment.

Due to use of such re-learnable actual load calculating device 16, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and the influences of the output characteristic of the automatic load measuring sensor 12, can be reflected on the weight information with higher accuracy. This makes it possible to correct the measured load information 12a with higher accuracy so that the actual load information 16a, that is, the true carrying load of the vehicle can be calculated.

Also, thanks to use of such re-learnable actual load calculating device 16, the change of the vehicle carrying load patterns as well as the change of the output characteristics of the automatic measuring sensors 12 can be reflected on the weight information 14a flexibly and quickly, which makes it possible to correct the measured load information 12a with higher accuracy in calculating the real load information 16a that is the true carrying load of the vehicle.

Next, description will be given below of the operation of the automatic load measuring device 10 according to the present embodiment of the invention with reference to FIG. 3.

FIG. 3 is a flow chart which explains the learning course of the automatic load measuring device 10 according to the present embodiment of the invention.

If the learning course of the automatic load measuring device 10 is started, then the sensor kind identification information 14b is input to the sensor kind identification neurons 15 of the multi-layer feed-forward type neural network (Step S1). In particular, the sensor kind identification information 14b is read out from the memory device 14.

Next, the measured load information 12a, which corresponds to any one of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle is input (Step S1→Step S2).

The thus input measured load information 12a (in particular, a numerical value which means a load in Kg, ton or the like) is standardized into a numerical value ranging from 0.1 to 0.9 (Step S2→Step S3).

In accordance with the above processings, the learning (in particular, the previous teach learning using the back propagation learning rules) is executed (Step S3→Step S4).

Next, the evaluation of the result of the learning is executed (Step S4→Step S5). In particular, it is evaluated whether the maximum error range between the measured load information 12a and the actual load calculating device 16 is reduced down to the range of 10% or less.

If a sufficient learning result is obtained ([Sufficient] in Step S6), then the learning course is ended ([Sufficient] in Step S6→Step S7).

If the learning result is found insufficient ([Insufficient] in Step S6), then a processing is repeated in which the learning processing is carried out again until it is evaluated that a sufficient learning result has been obtained ([Insufficient] in Step S6→Step S4→Step S5→Step S6). If a sufficient learning result is obtained ([Sufficient] in Step S6), then the learning course is ended ([Sufficient] in Step S6→Step S7).

As has been described heretofore, according to the illustrated embodiment of the invention, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and the influence of the output characteristics of the automatic load measuring sensors 12, can be corrected with high accuracy.

Also, due to use of the load display device 17, the actual load calculating device 16 that is the true vehicle carrying load calculated can be recognized real time on the spot.

Further, with use of the actual load calculating device 16 including a multi-layer feed-forward type neural network, the maximum error range between the measured load information 12a and the actual load calculating device 16 can be minimized by the shortest learning time and the smallest number of times of learning. That is, the measured load information 12a can be corrected with high learning accuracy and thus the actual load information 16a, that is, the true carrying load of the vehicle can be calculated.

Still further, by using the actual load calculating device 16 including the multi-layer feed-forward type neural network to be decided by the weight information 14a that is read out from the memory device 14, the measured load information 12a, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors 12, can be corrected with high accuracy in order that the actual load information 16a, that is, the true carrying load of the vehicle can be calculated. Also, since the weight information 14a can be stored into and read out from the memory device 14 at any time, the weight information 14a can be edited or debugged easily at a place which is away from the vehicle. Further, even if there occurs any inconvenience in the automatic load measuring device 10, the weight information 14a can be left retreated in the memory device 14. Due to this, after such inconvenience is eliminated, if the automatic load measuring device 10 is reset and the weight information 14a is read again into the automatic load measuring device 10, then the automatic load measuring device 10 can be started again quickly and easily.

Also, since the weight information 14a can be stored into and read out from the memory device 14 at any time, the weight information 14a can be edited or debugged easily at a place which is away from the vehicle. Further, even if there occurs any inconvenience in the automatic load measuring device 10, the weight information 14a can be left retreated in the memory device 14. Due to this, after such inconvenience is eliminated, if the automatic load measuring device 10 is reset and the weight information 14a is read again into the automatic load measuring device 10, then the automatic load measuring device 10 can be started again quickly and easily.

By using the actual load calculating device 16 including the multi-layer feed-forward type neural network with such sensor kind identification neurons 15 added thereto, the measured load information 12a, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors 12, can be corrected with high accuracy in order that the actual load information 16a, that is, the true carrying load of the vehicle can be calculated.

Due to use of the above-mentioned re-learnable actual load calculating device 16, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and also the influences of the output characteristics of the automatic load measuring sensors 12, can be reflected on the weight information with more accuracy. This makes it possible to correct the measured load information 12a with higher accuracy so that the actual load information 16a, that is, the true carrying load of the vehicle can be calculated. Also, thanks to use of such re-learnable actual load calculating device 16, the change of the vehicle carrying load patterns as well as the change of the output characteristics of the automatic load measuring sensors 12 can be reflected on the weight information 14a flexibly and quickly, which makes it possible to correct the measured load information 12a with higher accuracy, and to calculate the real load information 16a that is the true carrying load of the vehicle.

According to the automatic load measuring device of the invention, the influences of the patterns of the carrying loads of a vehicle such as the uniform carrying load, the forwardly biased carrying load, the backwardly biased carrying load, the right biased carrying load, the left biased carrying load, and the other similarly biased carrying loads of the vehicle, and the influences of the output characteristics of automatic load measuring sensors, can be corrected with high accuracy.

According to the automatic load measuring device of the invention, the influence of the output characteristic of the automatic load measuring sensors can be corrected with high accuracy.

According to the automatic load measuring device of the invention, the measured load information 12a, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load information, that is, the true carrying load of the vehicle can be calculated.

According to an automatic load measuring device of the invention, by using the actual load calculating device including a multi-layer feed-forward type neural network to be decided by the weight information that is read out from the memory device, the measured load information, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load calculating device, that is, the true carrying load of the vehicle can be calculated. Also, since the weight information can be stored into and read out from the memory device at any time, the weight information can be edited or debugged easily at a place which is away from the vehicle. Further, even if there occurs any inconvenience in present the automatic load measuring device, the weight information can be left retreated in the memory device. Due to this, after such inconvenience is eliminated, if the present automatic load measuring device 10 is reset and the weight information is read again into the automatic load measuring device 10, then the automatic load measuring device 10 can be started again quickly and easily.

According to the automatic load measuring device of the invention, by using the actual load calculating device including the multi-layer feed-forward type neural network with the sensor kind identification neurons added thereto, the measured load information, which has been influenced, by the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and/or by the output characteristics of the automatic load measuring sensors, can be corrected with high accuracy in order that the actual load calculating device, that is, the true carrying load of the vehicle can be calculated. Also, since the weight information can be stored into and read out from the memory device at any time, the weight information can be edited or debugged easily at a place which is away from the vehicle. Further, even if there occurs any inconvenience in present the automatic load measuring device, the weight information can be left retreated in the memory device. Due to this, after such inconvenience is eliminated, if the present automatic load measuring device 10 is reset and the weight information is read again into the automatic load measuring device 10, then the automatic load measuring device 10 can be started again quickly and easily.

According to the automatic load measuring device of the invention, due to use of the re-learnable actual load calculating device, the influences of the patterns of the carrying loads of the vehicle such as the uniform carrying load, the forwardly biased carrying load, the backwardly biased carrying load, the right biased carrying load, the left biased carrying load, and the other similarly biased carrying loads of the vehicle, and the influences of the output characteristics of the automatic load measuring sensors, can be reflected on the weight information with higher accuracy. This makes it possible to correct the measured load information with higher accuracy so that the actual load calculating device, that is, the true carrying load of the vehicle can be calculated.

Also, thanks to use of such re-learnable actual load calculating device, the change of the carrying load patterns of the vehicle as well as the change of the output characteristics of the automatic load measuring sensors can be reflected on the weight information 14a flexibly and quickly, which makes it possible to correct the measured load information with higher accuracy, and to calculate the actual load calculating device that is the true carrying load of the vehicle.

According to the automatic load measuring device of the invention, due to use of the re-learnable actual load calculating device, the maximum error range between the measured load information and the actual load calculating device can be minimized by the shortest learning time and the smallest number of times of learning. That is, the measured load information can be corrected with high learning accuracy and thus the actual load calculating device, that is, the true carrying load of the vehicle can be calculated.

According to the automatic load measuring device of the invention, due to use of the load display device, the actual load calculating device that is the true carrying load of the vehicle calculated can be recognized real time on the spot.

What is claimed is:

1. An automatic load measuring device comprising:

an actual load calculating device including a multi-layer feed-forward type neural network having an input layer, an intermediate layer and an output layer arranged in a hierarchical manner;

wherein said actual load calculating device uses said multi-layer feed-forward type neural network which has undergone previous learning relating to a correction of a carrying load of a vehicle to be measured by automatic load measuring sensors respectively used to measure the carrying load of the vehicle, said learning being accomplished by using given learning parameters;

and wherein said correction of the carrying load of the vehicle measured by said automatic load measuring sensors is based on the result of said learning to find an actual load of the vehicle.

2. The automatic load measuring device of claim 1, wherein said given learning parameters are measured load information which are respectively measured about the carrying loads of the vehicle by said automatic load measuring sensors.

3. The automatic load measuring device of claim 1, wherein neurons forming said input layer are set in number according to the number of said given learning parameters one to one and are respectively combined with their associated ones of all the neurons forming said intermediate layer in accordance with weight information previously learned about all the neurons forming said intermediate layer, neurons forming said output layer are respectively combined with their associated ones of all the neurons forming said intermediate layer in accordance with weight information previously learned about all the neurons forming said intermediate layer, and actual load information is output in accordance with a neuro-operation using said given learning parameters.

4. The automatic load measuring device of claim 3, further comprising a memory device capable of storing therein and reading out therefrom at any time said weight information previously learned between said input layer and said intermediate layer as well as said weight information previously learned between said intermediate layer and said output layer, wherein neurons forming said input layer are set in number according to the number of said given learning parameters one to one and are respectively combined with their associated ones of all the neurons forming said intermediate layer in accordance with said weight information previously learned between said input layer and said intermediate layer and read out from said memory device with respect all the neurons forming said intermediate layer, neurons forming said output layer are respectively combined with their associated ones of all the neurons forming said intermediate layer in accordance with said weight information previously learned between said intermediate layer and said output layer and read out from said memory device with respect to all the neurons forming said intermediate layer, and an actual load information is output in accordance with a neuro-operation using said given learning parameters.

5. The automatic load measuring device of claim 4, wherein a transmission function between said input layer and said intermediate layer is a tangent sigmoid function and a transmission function between said intermediate layer and said output layer is a pure line function.

6. The automatic load measuring device of claim 3, wherein said actual load calculating device further includes, between said input layer and said intermediate layer, sensor kind identification neurons which are respectively used to input sensor kind identification information for identifying the kind of said automatic load measuring sensors, and wherein said sensor kind identification neurons are respectively combined with their associated one of all the neurons forming said input layer in accordance with weight information previously learned between said sensor kind identification neurons and said input layer about all the neurons forming said input layer according to said sensor kind identification information, and are combined with their associated one of all the neurons forming said intermediate layer in accordance with weight information previously learned between said sensor kind identification neurons and said intermediate layer about all the neurons forming said intermediate layer according to said sensor kind identification information.

7. The automatic load measuring device of claim 6, further comprising a memory device capable of storing therein and reading out therefrom at any time said weight information previously learned between said input layer and said intermediate layer, said weight information previously learned between said intermediate layer and said output layer, said weight information previously learned between said sensor kind identification neurons and said input layer about all the neurons forming said input layer according to said sensor kind identification information, and said weight information previously learned between said sensor kind identification neurons and said intermediate layer about all the neurons forming said intermediate layer according to said sensor kind identification information, wherein said sensor kind identification neurons are respectively combined with the neurons of said input layer in accordance with said weight information between said sensor kind identification neurons and said input layer that is read out from said memory device, said sensor kind identification neurons are respectively combined with the neurons of said intermediate layer in accordance with said weight information between said sensor kind identification neurons and said intermediate layer that is read out from said memory device, said neurons forming said input layer are respectively combined with all the neurons forming said intermediate layer in accordance with said previously learned weight information between said input layer and said intermediate layer that is read out from said memory device, and said neurons forming said intermediate layer are respectively combined with all the neurons forming said output layer in accordance with said previously learned weight information between said intermediate layer and output layer that is read out from said memory device.

8. The automatic load measuring device of claim 7, wherein a transmission function between said input layer and said intermediate layer is a tangent sigmoid function and a transmission function between said intermediate layer and said output layer is a pure line function.

9. The automatic load measuring device of claim 3, further comprising a load display device displayable said actual load information.

10. The automatic load measuring device of claim 1, wherein said actual load calculating device is arranged such that it is able to correct a teacher signal and execute a re-learning operation in response to a manual adjustment.

* * * * *